United States Patent [19]

Borromeo

[11] Patent Number: 4,676,120
[45] Date of Patent: Jun. 30, 1987

[54] HANDLEBAR SUPPORT WITH STORAGE COMPARTMENT

[75] Inventor: Lucio Borromeo, Turin, Italy

[73] Assignee: 3 T S.p.A., Turin, Italy

[21] Appl. No.: 869,771

[22] Filed: Jun. 2, 1986

[30] Foreign Application Priority Data

Sep. 26, 1985 [IT] Italy ................ 53858/85[U]

[51] Int. Cl.⁴ ............................................. B62K 21/12
[52] U.S. Cl. .................................. 74/551.1; 280/280
[58] Field of Search .................... 74/551.1, 551.3; 403/344, 367, 374, 378, 109, 110; 280/279, 280

[56] References Cited

U.S. PATENT DOCUMENTS

| | | | |
|---|---|---|---|
| 1,074,839 | 10/1913 | Curry | 403/367 |
| 1,138,368 | 5/1915 | Feeley | 403/367 |
| 2,770,479 | 11/1956 | Hilber | 403/374 |
| 3,310,325 | 3/1967 | McCauley | 280/279 |
| 3,655,219 | 4/1972 | Jacoby | 280/279 |
| 3,705,733 | 12/1972 | Koyama et al. | 280/279 |
| 4,310,260 | 1/1982 | Katayama | 403/374 |
| 4,354,399 | 10/1982 | Katayama | 74/551.1 |

FOREIGN PATENT DOCUMENTS 253155 11/1948 Switzerland ................ 74/280

OTHER PUBLICATIONS

*Japan's Bicycle Guide 1982*, vol. 32, pp. 144-151.

Primary Examiner—Cornelius J. Husar
Assistant Examiner—Anthony Knight
Attorney, Agent, or Firm—Sughrue, Mion, Zinn, Macpeak, and Seas

[57] ABSTRACT

In a handlebar comprising an elongate handle arm and a boss which supports the central part of the arm, the boss has an aperture with a generally channel-shaped region for receiving the central part of the arm, and a pressure body is mounted in the aperture for selective movement into a thrust position against the central part of the arm to press the central part into the generally channel-shaped region of the aperture so as to clamp the arm relative to the boss.

3 Claims, 2 Drawing Figures

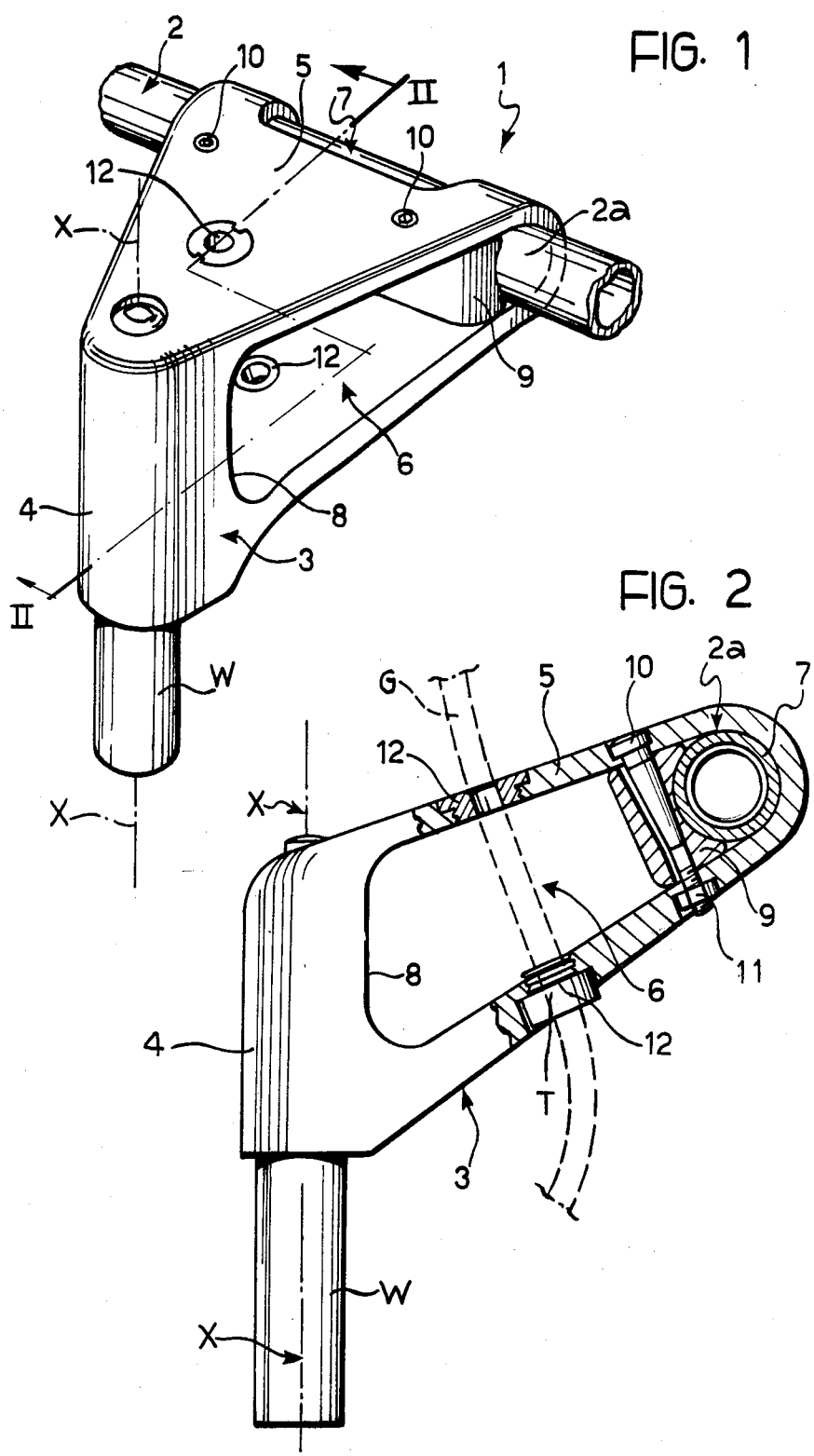

HANDLEBAR SUPPORT WITH STORAGE COMPARTMENT

DESCRIPTION

The present invention relates to handlebars of the type comprising an elongate handle arm and a boss which supports the central part of the arm.

Handlebars of this type are currently fitted to bicycles and may also be used on light motorcycles.

The handlebar of the invention has been developed with particular attention to its possible use on bicycles for mountain use, currently called "mountain bikes".

The handlebar of the invention is characterised in that:

the boss has an aperture with a generally channel-shaped region for receiving the central part of the arm, and a pressure body is mounted in the aperture and can be moved selectively into a thrust position against the central part of the arm to press the central part into the generally channel-shaped region of the aperture so as to clamp the arm relative to the boss.

Preferably, the boss of the handlebar according to the invention has dimensions which gradually increase from one end, where the axis of orientation of the handlebar is located, towards the opposite end, where the generally channel-shaped region of clamping of the central part of the arm is located. The aperture, which is generally elongate, thus defines a cavity extending within the boss and able to act as a space for carrying objects.

The handlebar according to the invention has considerable practical and useful advantages over known handlebars. Among these advantages may be noted:

an increased structural strength, a considerable simplification of the assembly, adjustment, and removal of the handlebar, and the availability of a space within the boss for carrying objects, the boss also possibly providing a rest for maps and other documents to be consulted continuously by the user.

These advantages are particularly appreciated in the use of the handlebar on a bicycle for mountain use.

Further characteristics and advantages of the invention will become apparent from the following description, given purely by way of non-limiting example and with reference to the appended drawings, in which:

FIG. 1 is a perspective view of a handlebar according to the invention, and

FIG. 2 is a partial section taken on the line II—II of FIG. 1.

In FIG. 1, a handlebar for fitting preferably to a bicycle for mountain use (mountain bike), not illustrated in its entirety, is generally indicated 1. The handlebar 1 comprises, as essential parts:

a handle arm 2 of generally elongate form, on the ends of which are mounted the handgrips of the handlebar and the associated brake controls (not illustrated in the drawings), and a boss 3 which supports the central part 2a of the arm and is connected to the steering members of bicycle (not illustrated) so as to be orientable about an approximately vertical axis, indicated X—X in the drawings.

The arm 2 may be constituted, for example, by a metal tube shaped in accordance with the specific applicational requirements.

The boss 3 is constituted essentially by a sleeve 4 for assembly on a steering member, such as shaft W of the bicycle, and a head part 5 of generally triangular form projecting from the sleeve 4.

For guidance, the overall configuration of the boss 3 can be likened essentially to that of the head of a golf club but of slightly larger dimensions.

Within the head 5, which has a generally annular, flattened structure, is a generally elongate aperture 6 which can be seen to have two ends, indicated 7 and 8 respectively.

The second end 8 is located in correspondence with the sleeve 4, that is, adjacent the axis of orientation X—X of the handlebars 1. The end 7, however, is in a slightly higher position (when the boss 3 is mounted on the bicycle). In other words, the aperture 6 extends in a direction which is generally inclined to the axis X—X.

As shown best in the perspective view of FIG. 1, the head 5, and hence the aperture 6 therein, has dimensions which gradually increase from the end 7 towards the end 8.

The arm 2 of the handlebar is inserted in the boss 3 such that the central part 2a extends within the aperture 6 at the end 7. This latter end defines a generally channel-shaped recess constituting a sort of cradle for receiving the central part 2a of the arm 2.

A shaped body, indicated 9, is mounted within the aperture 6 and bears against the central part 2a of the arm 2 on its side opposite the end 7 of the aperture 6.

The shaped body 9 has associated thrust members which enable the body 9 to be forced against the central part 2a of the arm 2 so as to clamp it tightly within the channel-shaped recess defined by the end 7 of the aperture 6. In the clamped condition, the arm 2 is locked relative to the boss 3 and the handlebar 1 has the necessary rigidity for use.

If the body 9 is moved away from the central part 2a of the arm 2 so as to loosen the clamping thereof within the aperture 6 of the boss, the arm 2 can be oriented and adapted to the requirements of use, or made to slide longitudinally in the aperture 6 so as to allow the removal of the handlebar 1.

The thrust means associated with the pressure body 9 can be formed by various methods. In the embodiment illustrated, two conical pins 10, which are slidably mounted in the side of the body 9 opposite the central part 2a of the arm 2, pass completely through the head 5 of the boss and can be made to move in the direction of introduction into and removal from the head 5 by means of adjusting nuts or wing nuts 11.

In particular (see FIG. 2) one can draw the pins 10 into the head 5 by tightening the nuts 11, so as to press the body 9 firmly against the central part 2a of the arm, which is clamped to the boss 2.

When it is desired to vary the orientation of the arm 2 relative to the boss 3 or to remove the handlebar, it suffices to slacken the nuts 11 so as to cause the body 9 to move away from the central part 2a and consequently reduce the clamping to which the central part 2a is subject.

Numerous alternative solutions are possible, of course, all of which fall within the scope of the present invention. For example, the conical pins 10 may be replaced by other ramp operating members such as eccentric bodies which are rotated by means of levers, knobs or nuts so as to bring the body 9 selectively into a thrust position against the central part 2a of the arm 2.

The configuration of the head 5, and particularly the generally elongate shape of the aperture 6, means that only one end part of the aperture is occupied by the central part 2a of the arm and the clamping members (body 9, conical pins 10 or equivalent members) associated therewith. The remaining portion of the cavity 6, which thus has dimensions which are substantially greater than the dimensions of the central part 2a of the arm 2, is completely free and may be used to advantage as a space for carrying objects.

Possibly, according to the solution referred to in the appended drawings, holes 12 may be provided in the walls of the head 5 through which the flexible control, illustrated schematically in broken outline and indicated G in FIG. 2 only, of one of the brakes of the bicycle can be passed. In this case, the head 5 of the boss 3 may be used for the mounting of an adjusting ring T for the flexible control.

The generally divergent or at least enlarged form of the head 5 also means that the upper face 5a of the head can be used to advantage, with the possible addition of accessory support members (not illustrated), as a support surface for road maps and like documents to be consulted frequently by the cyclist.

Preferably, the body of the boss 3 is constituted by a single piece of pressed metal alloy.

Naturally, the scope of the present invention also extends to models which allow equal utility to be achieved by using the same innovative concept.

What is claimed is:

1. A handlebar support comprising a boss having a tubular sleeve portion with a longitudinal axis at one end of the boss adapted to receive and be secured to a vertically disposed steering member on a bicycle and a substantially triangular head portion projecting from said tubular portion away from said axis, said triangular head portion having a flat triangular upper surface and an aperture extending through the head portion parallel to substantially coextensive with said upper surface and orthogonal to said axis, the portion of said boss remote from said sleeve defining an end wall for said aperture having an elongated inner curved surface disposed orthogonal to said axis for receiving a tubular handlebar and clamping means disposed in said aperture for releasably clamping a tubular handlebar against said inner curved surface of said end wall whereby the flat upper surface of said boss provides a convenient map support and said aperture provides a storage compartment for articles.

2. A handlebar support as set forth in claim 1 wherein said flat triangular upper surface of said head portion is inclined upwardly at an acute angle relative to said axis.

3. A handlebar support as set forth in claim 1 wherein said clamping means is comprised of an elongated clamping member having a curved surface adapted to engage a handlebar opposite said curved inner surface of said end wall and camming means moveably supported on said head portion in contact with said clamping member for moving said clamping member into and out of clamping engagement with a handlebar.

* * * * *